(12) United States Patent
Magai et al.

(10) Patent No.: US 10,068,321 B2
(45) Date of Patent: Sep. 4, 2018

(54) IMAGE PROCESSING METHOD, IMAGE PROCESSING APPARATUS, AND RECORDING MEDIUM

(71) Applicant: CANON KABUSHIKI KAISHA, Tokyo (JP)

(72) Inventors: Koichi Magai, Tokyo (JP); Masakazu Matsugu, Yokohama (JP); Shunta Tate, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 14/946,613

(22) Filed: Nov. 19, 2015

(65) Prior Publication Data

US 2016/0154995 A1  Jun. 2, 2016

(30) Foreign Application Priority Data

Nov. 28, 2014  (JP) .................................. 2014-242444

(51) Int. Cl.

| G06K 9/00 | (2006.01) |
|---|---|
| G06T 7/00 | (2017.01) |
| G06K 9/46 | (2006.01) |
| G06K 9/62 | (2006.01) |

(52) U.S. Cl.
CPC ........ *G06T 7/0002* (2013.01); *G06K 9/00362* (2013.01); *G06K 9/4642* (2013.01); *G06K 9/4652* (2013.01); *G06K 9/6286* (2013.01)

(58) Field of Classification Search
CPC .......... G06K 9/00362; G06K 9/00369; G06K 9/00375; G06K 9/4652; G06K 9/6286; G06K 9/4642; G06T 7/0002; G06T 7/10–7/194; G06T 2207/30196; G06T 2207/30201; G06T 2207/30088
USPC ........................................................ 382/164
See application file for complete search history.

(56) References Cited

U.S. PATENT DOCUMENTS

2006/0098865 A1* 5/2006 Yang .................. G06K 9/00362
382/159

FOREIGN PATENT DOCUMENTS

JP  2010-271861 A  12/2010

OTHER PUBLICATIONS

Viola, Paul, and Michael Jones. "Rapid object detection using a boosted cascade of simple features." Computer Vision and Pattern Recognition, 2001. CVPR 2001. Proceedings of the 2001 IEEE Computer Society Conference on. vol. 1. IEEE, 2001.*

(Continued)

*Primary Examiner* — Geoffrey E Summers
(74) *Attorney, Agent, or Firm* — Canon U.S.A., Inc. IP Division

(57) ABSTRACT

When a human skin region is detected, misdetection or detection failure is prevented. An image processing apparatus of the present invention acquires an image from which a human body skin region is to be extracted, and estimates a human body part region in the image. The image processing apparatus then estimates a skin attribute of the estimated human body part region and corrects the human body part region based on the estimated skin attribute. The image processing apparatus extracts the skin region from the acquired image based on the skin attribute of the estimated human body part region and the corrected human body part region.

18 Claims, 5 Drawing Sheets

(56) References Cited

OTHER PUBLICATIONS

Hua, Gang, Ming-Hsuan Yang, and Ying Wu. "Learning to estimate human pose with data driven belief propagation." Computer Vision and Pattern Recognition, 2005. CVPR 2005. IEEE Computer Society Conference on. vol. 2. IEEE, 2005.*

Chen, Tao, et al. "Poseshop: Human image database construction and personalized content synthesis." IEEE Transactions on Visualization and Computer Graphics 19.5 (2013): 824-837.*

Yoav Freund, A Decision-theoretic generalization of on-line learning and an application to boosting, AT & T Bell Laboratories, Murray Hill, NJ Yoav, pp. 1-34 Oct. 2015.

Pedro Felzenszwalb, A Discriminatively Trained, Multiscale, Deformable Part Model, National Science Foundation Under Grant No. 0534820 and 0535174, pp. 1-8 Oct. 2015.

Navneet Dalal, Histograms of Oriented Gradients for Human Detection, http://lear.inrialpes.fr, pp. 1-8, Oct. 2015.

Leo Breiman, Random Forests, Machine Learning 45, 5-32, 2001.

Michal Kawulok, Spatial-based skin detection using discriminative skin-presence features, Pattern Recognition Letters, 41 (2014) 3-13.

* cited by examiner

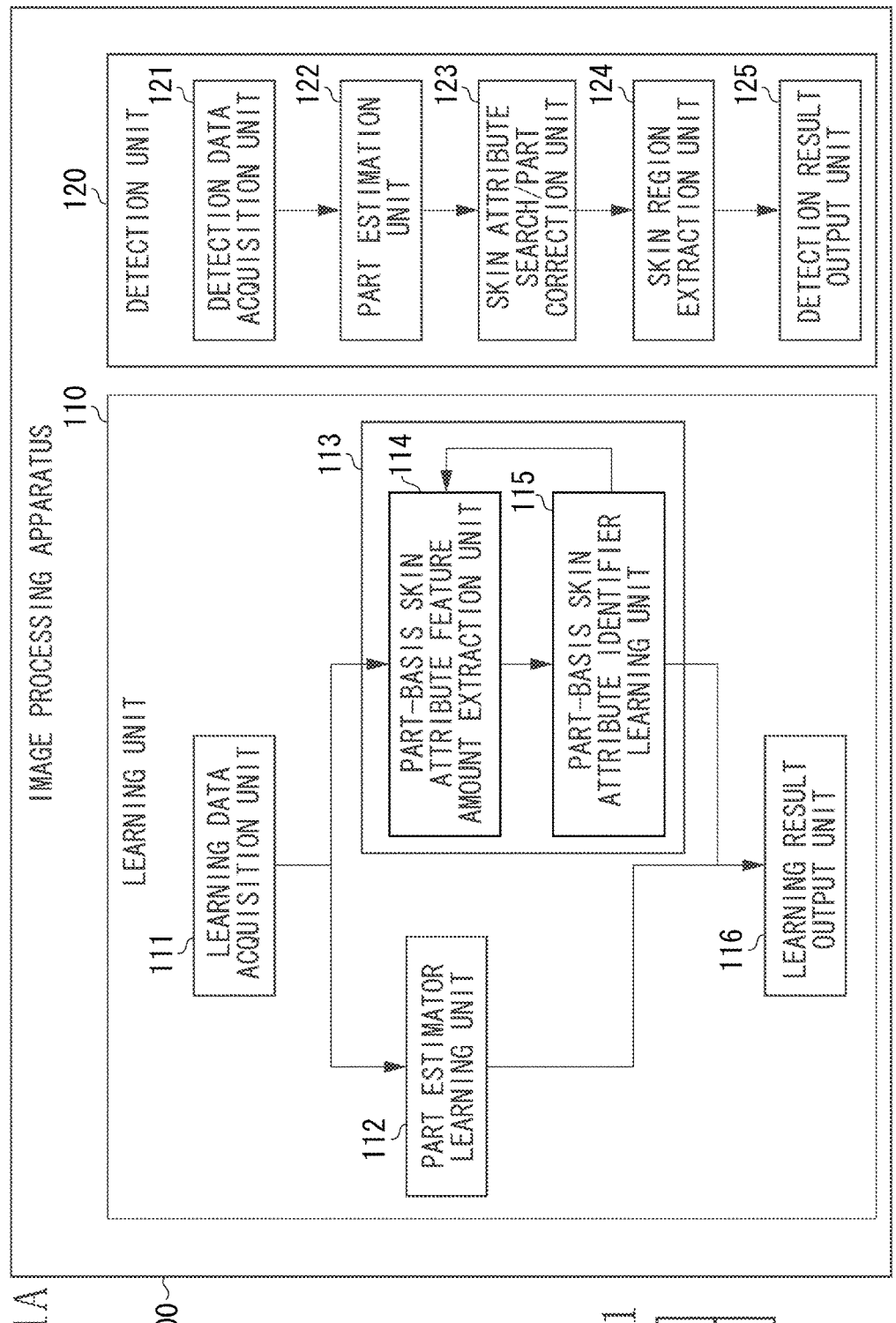

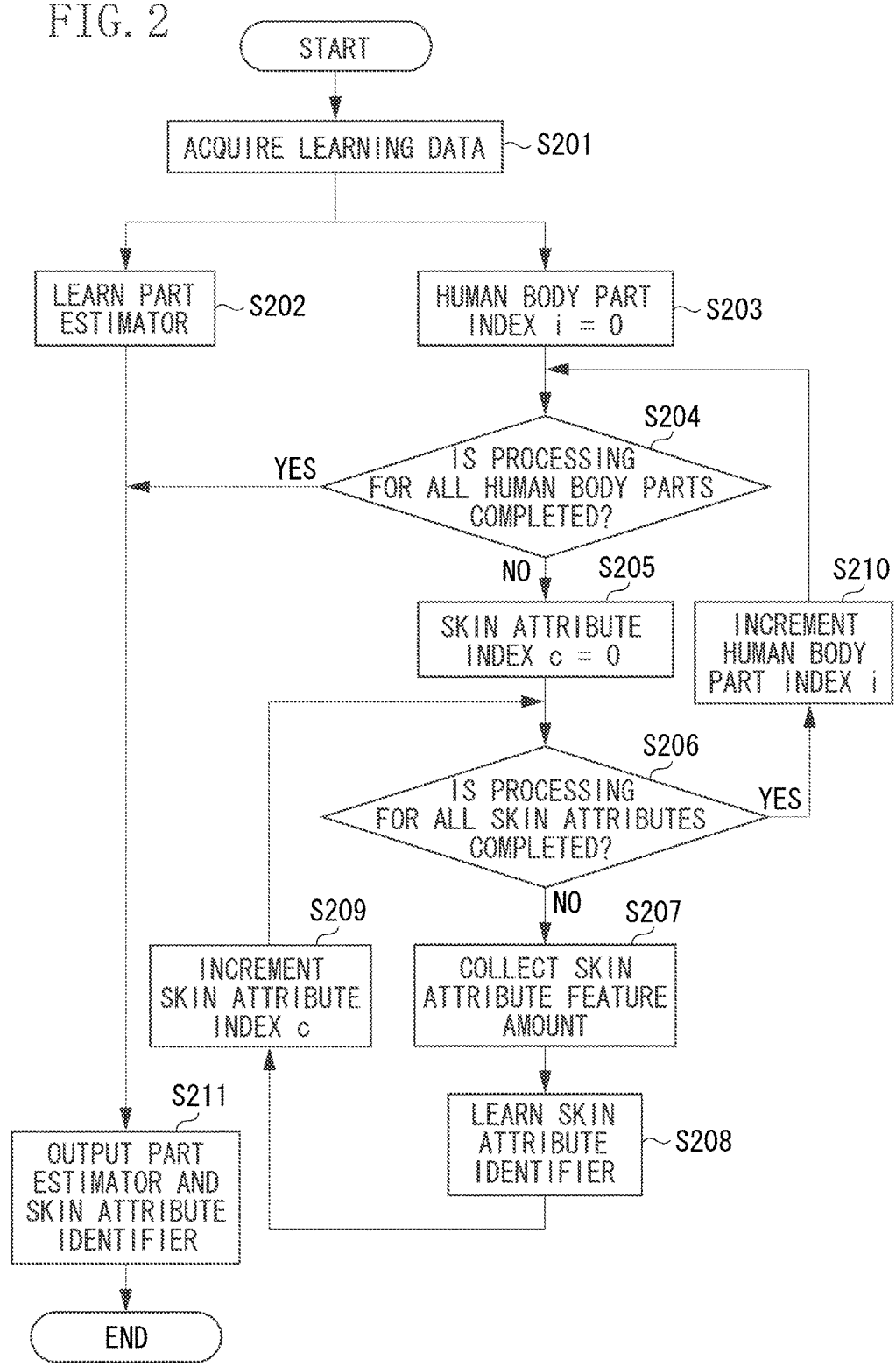

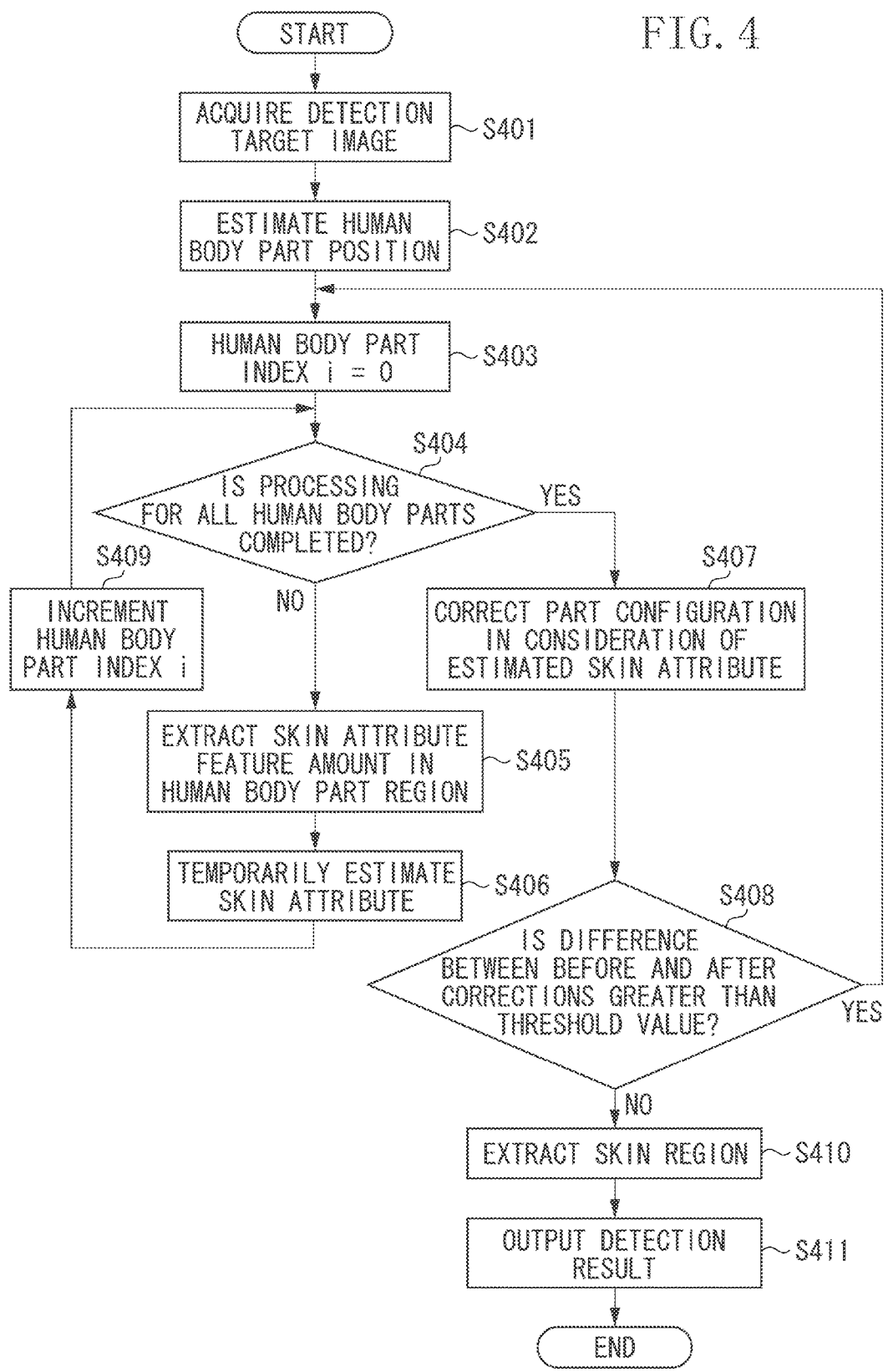

IMAGE PROCESSING METHOD, IMAGE PROCESSING APPARATUS, AND RECORDING MEDIUM

BACKGROUND

Field of the Disclosure

Aspects of the present invention generally relates to a technique for extracting a human skin region in an image or video image.

Description of the Related Art

A method for detecting a human skin region in an image has been conventionally known. Non-patent literature 1 (M. Kawulok, J. Kawulok, J. Nalepa, and M. Papiez, "Skin detection using spatial analysis with adaptive seed," IEEE Conference on Image Processing (ICIP), 2013.) discusses a method for detecting a human skin region. According to the method, a global skin probability map is generated based on skin color information, and a local skin model is generated using a face detection result. The generated map and model are integrated to detect a human skin region.

However, according to the method for detecting the human skin region based on the color information discussed in non-patent literature 1, a region with color similar to human skin, which is not a human skin region, may be mistakenly detected as a human skin region, or a human skin region may not be detected due to shadow.

SUMMARY

According to an aspect of the present invention, an image processing apparatus includes an acquisition unit configured to acquire an image from which a skin region of a human body is to be extracted, a part estimation unit configured to estimate a human body part region in the acquired image, a skin attribute estimation unit configured to estimate a skin attribute of the estimated human body part region, a part correction unit configured to correct the human body part region based on the estimated skin attribute, and a skin region extraction unit configured to extract the skin region from the acquired image based on the skin attribute of the estimated human body part region and the corrected human body part region.

Further features of the present disclosure will become apparent from the following description of exemplary embodiments with reference to the attached drawings.

BRIEF DESCRIPTION OF THE DRAWINGS

FIGS. 1A and 1B are schematic block diagrams illustrating an image processing apparatus according to a first exemplary embodiment.

FIG. 2 is a flowchart illustrating learning processing according to the first exemplary embodiment.

FIG. 4 is a flowchart illustrating detection processing according to the first exemplary embodiment.

DESCRIPTION OF THE EMBODIMENTS

Hereinafter, exemplary embodiments are described in detail below with reference to the drawings.

In a first exemplary embodiment, human body areas includes head, body, right and left upper arms (shoulders-elbows), right and left forearms and hands (elbows-fingertips), right and left thighs (hip-knees), and right and left lower legs and feet (knees-toes). A circumscribed rectangle corresponding to each human body area is referred to as a human body part. A circumscribed rectangle surrounding the entire human body is referred to as a root human body part.

Figure 1B:
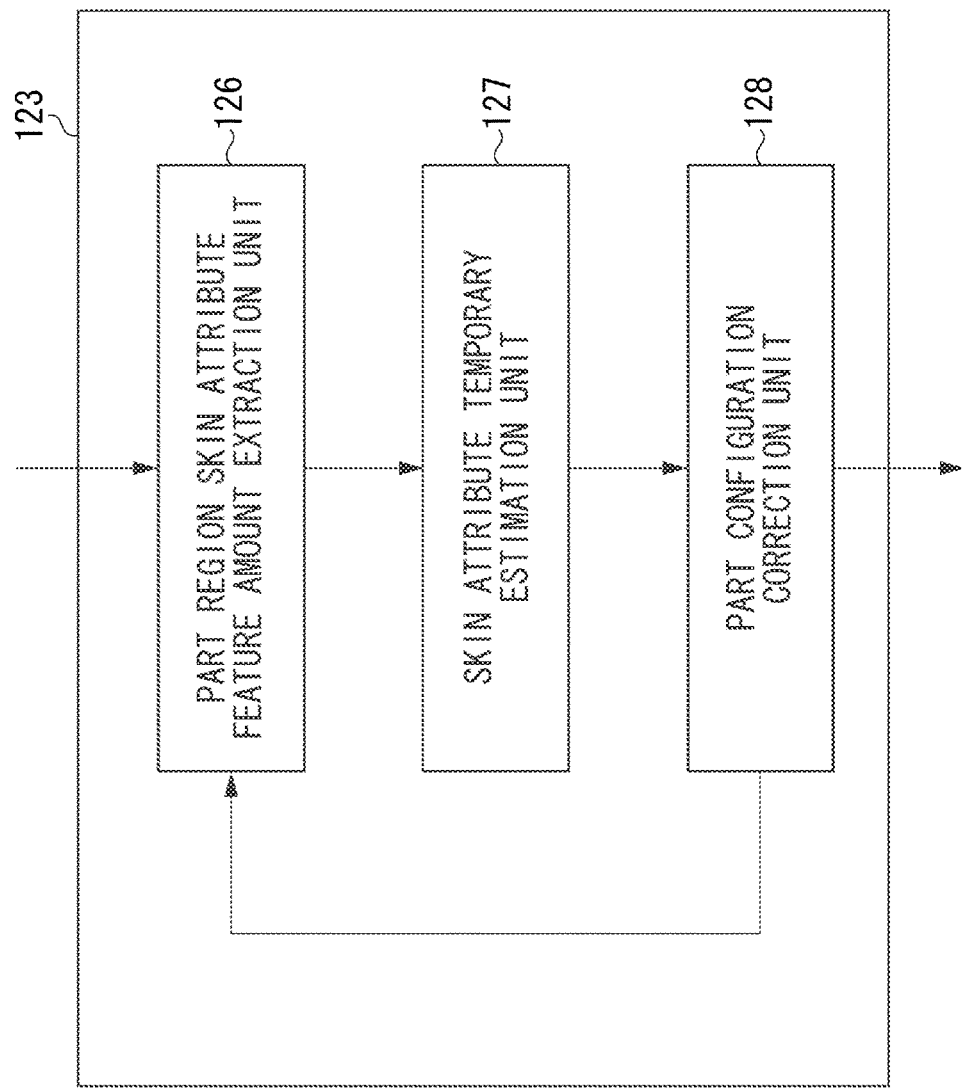

FIGS. 1A and 1B are block diagrams illustrating a functional configuration of an image processing apparatus 100 according to the present exemplary embodiment. In FIG. 1A, the image processing apparatus 100 includes a learning unit 110 and a detection unit 120. The learning unit 110 includes a learning data acquisition unit 111, a part estimator learning unit 112, a part-basis skin attribute processing unit 113, and a learning result output unit 116. The part-basis skin attribute processing unit 113 includes a part-basis skin attribute feature amount extraction unit 114, and a part-basis skin attribute identifier learning unit 115.

Moreover, the detection unit 120 includes a detection data acquisition unit 121, a part estimation unit 122, a skin attribute search/part correction unit 123, a skin region extraction unit 124, and a detection result output unit 125.

Moreover, FIG. 1B illustrates a configuration of the skin attribute search/part correction unit 123. As illustrated in FIG. 1B, the skin attribute search/part correction unit 123 includes a part region skin attribute feature amount extraction unit 126, a skin attribute temporary estimation unit 127, and a part configuration correction unit 128.

Each of functional units of the image processing apparatus 100 illustrated in FIGS. 1A and 1B can be realized when software (a program) acquired via a network or various recording media is executed by a calculator that includes a central processing unit (CPU), a memory, a storage device, an input and output device, and a bus. As for the calculator (not illustrated), a general-purpose calculator may be used, or hardware suitably designed for the software may be used.

The image processing apparatus 100 according to the present exemplary embodiment performs skin region detection processing. The operation of the skin region detection processing is roughly divided into learning processing performed by the learning unit 110 and detection processing performed by the detection unit 120. The processing do not need to be performed successively. If the learning processing is performed once, the detection processing may be performed at an optional timing. FIG. 2 is a flowchart illustrating the learning processing for the skin region detection processing according to the present exemplary embodiment.

In step S201, the learning data acquisition unit 111 acquires a positive example image group, a negative example image group, and positive example region-of-interest information as learning data. The positive example region-of-interest information represents information about an object that serves as a recognition target of each positive example image. In the present exemplary embodiment, boundary rectangle information as information about a human body part region, skin region mask information as information about skin color, skin attribute information, and rectangle information of the root human body part are provided as the positive example region-of-interest information for each positive example image. Herein, the skin attribute represents an element for determining how skin color looks. In the present exemplary embodiment, the skin attribute includes skin types and illumination conditions. The skin types include three types, i.e., black, white, and yellow races. The illumination conditions include light source types and reflection intensity. The light source types include four types, i.e., sunlight, a fluorescent lamp, an incandescent lamp, and a light emitting diode (LED). The reflection intensity includes three types, i.e., no shadow, light shadow, and dark shadow. Such learning data is processed as needed, and then transferred to the part estimator learning unit 112 and the part-basis skin attribute feature amount extraction unit 114.

In step S202, the part estimator learning unit 112 learns a part estimator using a technique of deformable parts model that can also be used for human body detection. A method for learning the part estimator is discussed in, for example, non-patent literature 2 (P. Felzenszwalb, D. McAllester, and D. Ramanan, "A discriminatively trained, multiscale, deformable part model," IEEE Conference on Computer Vision and Pattern Recognition (CVPR), 2008.).

According to the method discussed in non-patent literature 2, one object is expressed by a combination of tree models, and a node of the tree corresponds to a model (a part model) that is generated by modeling a partial region of the object. A position of each part model is allowed to change within a range that is determined beforehand, when identification processing is performed. Hereinafter, a detection device using such a model is referred to as a part detection device.

The models discussed in non-patent literature 2 include a root model and a part model. The root model is generated by modeling the entire object which is to be an identification target. The part model includes a plurality of rectangular regions, and is generated by modeling a partial region of the object. A resolution used for generation of the part model is set to be twice as much as that used for generation of the root model. A histogram of oriented gradients (HOG) feature extracted based on a brightness gradient is used as a feature amount. The HOG feature amount is discussed in, for example, non-patent literature 3 (N. Dalal, and B. Triggs, "Histograms of oriented gradients for human detection," IEEE Conference on Computer Vision and Pattern Recognition (CVPR), 2005.). When an object is identified, an identification score is calculated for each part model to identify the object based on a total score of the calculated scores. The score is calculated using a discriminant function expressed by Expression 1.

$$\sum_{i=0}^{n} F_i \cdot \phi(H, p_i) + \sum_{i=1}^{n} \{a_i \cdot (x'_i, y'_i) + b_i \cdot (x'^2_i, y'^2_i)\} \quad \text{[Expression 1]}$$

A first term of Expression 1 indicates a score calculated from a weight vector $F_i$ of the root model and the part model acquired by the learning processing and a feature vector $\varphi$ (H, $p_i$) acquired from an image. The weight vector $F_i$ of the root model or the part mode is hereinafter referred to as a root filter or a part filter. The feature vector $\varphi$ (H, $p_i$) is acquired by connecting HOG features in the order of scanning in a rectangular region in a scale image corresponding to each model. Hereinafter, a rectangular region corresponding to the root model is referred to as a root rectangular region, and a rectangular region corresponding to the part model is referred to as a part rectangular region.

In the feature vector $\varphi$ (H, $p_i$), H represents a Hog feature pyramid, and $p_i$ is expressed by Expression 2 below. The variable $p_i$ indicates the root rectangular region if i=0. The variable $p_i$ indicates the part rectangular region if i>0.

$$p_i = (x_i, y_i, l_i) \quad \text{[Expression 2]}$$

Where $l_i$ represents an index indicating a hierarchy of the HOG feature pyramid, and ($x_i$, $y_i$) represents center coordinates on the index $l_i$ of the part rectangular region $p_i$.

A second term of Expression 1 corresponds to a cost function relating to change in the position of the part model. The cost function is defined based on a relative position of the part filter with respect to the root filter. In the second term of Expression 1, $a_i$ and $b_i$ represent coefficients of the cost function acquired by the learning processing, and $x'_i$ and $y'_i$ indicate change in normalized relative position of the part rectangular region to be defined with respect to the root rectangular region, and are defined by Expression 3 below.

$$(x'_i, y'_i) = ((x_i, y_i) - 2(x, y) + v_i)/s_i \quad \text{[Expression 3]}$$

where (x, y) represents center coordinates of a root boundary rectangle, and vi represents a two-dimensional vector indicating a relative positional relationship between reference center coordinates of the root model and reference center coordinates of the part model. The reference center coordinates are determined as hidden variables (described below) when the learning processing is performed. In Expression 3, $s_i$ represents a size of a part rectangular region corresponding to the region $p_i$, and "2" in a second term of a numerator on the right side is a coefficient for matching a coordinate scale of the root filter with a coordinate scale of the part filter.

In the learning processing, β and z are obtained when Expression 1 is expressed by Expression 4 s.

$$\sum_{i=0}^{n} F_i \cdot \phi(H, p_i) + \sum_{i=1}^{n} \{a_i \cdot (x'_i, y'_i) + b_i \cdot (x'^2_i, y'^2_i)\} = \beta \cdot \psi(H, z) \quad \text{[Expression 4]}$$

where β and ψ(H, z) are expressed as follows.

$$\beta = (F_0, \ldots, F_n, a_1, b_1, \ldots, a_n, b_n) \quad \text{[Expression 5]}$$

$$\psi(H,z) = (\phi(H,p_0), \phi(H,p_1), \ldots, \phi(H,p_n), x'_1, y'_1, x'^2_1, y'^2_1, \ldots, x'_n, y'_n, x'^2_n, y'^2_n) \quad \text{[Expression 6]}$$

Where z represents a hidden variable indicating a reference arrangement (reference center coordinates, a reference scale) of the root model and the part model simultaneously determined by the learning processing. The hidden variable z is expressed by Expression 7.

$$z = (p_0, \ldots, p_n) \quad \text{[Expression 7]}$$

According to the technique discussed in non-patent literature 2, ten part models are used in addition to the root model. Thus, in step S202, the part estimator learning unit 112 causes the aforementioned human body parts to correspond to respective part models. The part estimator learning unit 112 receives an image including a human body as a positive example image group, an image without a human body as a negative example image group, and root human body part information as partial positive example region-of-interest information from the learning data acquisition unit 111. The part estimator learning unit 112 learns a part estimator including the root model corresponding to the root human body part and the part models corresponding to each human body part, and then transfers the part estimator generated by the learning to the learning result output unit 116.

In step S203, the part-basis skin attribute feature amount extraction unit 114 initializes a human body part index i serving as a variable for designating a human body part to zero.

Subsequently, in step S204, the part-basis skin attribute feature amount extraction unit 114 checks a value of the human body part index i to determine whether processing for all the human body parts is completed. If the part-basis skin attribute feature amount extraction unit 114 determines that the processing for all the human body parts is not completed (NO in step S204), the processing proceeds to step S205. If the part-basis skin attribute feature amount extraction unit 114 determines that the processing for all the human body parts is completed (YES in step S204), the processing proceeds to step S211.

In step S205, the part-basis skin attribute feature amount extraction unit 114 initializes a skin attribute index c serving as a variable for designating a skin attribute to zero. In the present exemplary embodiment, three racial types, i.e., black, white, and yellow races, as skin types, four illuminant types, i.e., sunlight, a fluorescent lamp, an incandescent lamp, and a light emitting diode (LED), as light source types, and three shadow types, i.e., no shadow, light shadow, and dark shadow, as reflection intensity are available. Since the skin attribute information is expressed as a combination of these types, the total number of indexes is 36 (36 types).

In step S206, the part-basis skin attribute feature amount extraction unit 114 checks a value of the skin attribute index c to determine whether processing for all the skin attributes is completed. If the part-basis skin attribute feature amount extraction unit 114 determines that the processing for all the skin attributes is completed (YES in step S206), the processing proceeds to step S210. In step S210, the human body part index i is incremented, and the processing returns to step S204. If the part-basis skin attribute feature amount extraction unit 114 determines that the processing for all the skin attributes is not completed (NO in step S206), the processing proceeds to step S207.

In step S207, the part-basis skin attribute feature amount extraction unit 114 refers to positive example region-of-interest information from the positive example image group received from the learning data acquisition unit 111 to collect a feature amount of an attentional skin attribute (the index c) of an attentional human body part (the index i). The collection of the skin attribute feature amount is performed in such a manner that the part-basis skin attribute feature amount extraction unit 114 specifies a skin region using a skin region mask with respect to the attentional human body part included in the region-of-interest information, and vectorizes a red-green-blue (RGB) value indicating color information for each pixel forming the skin region.

Figure 3:
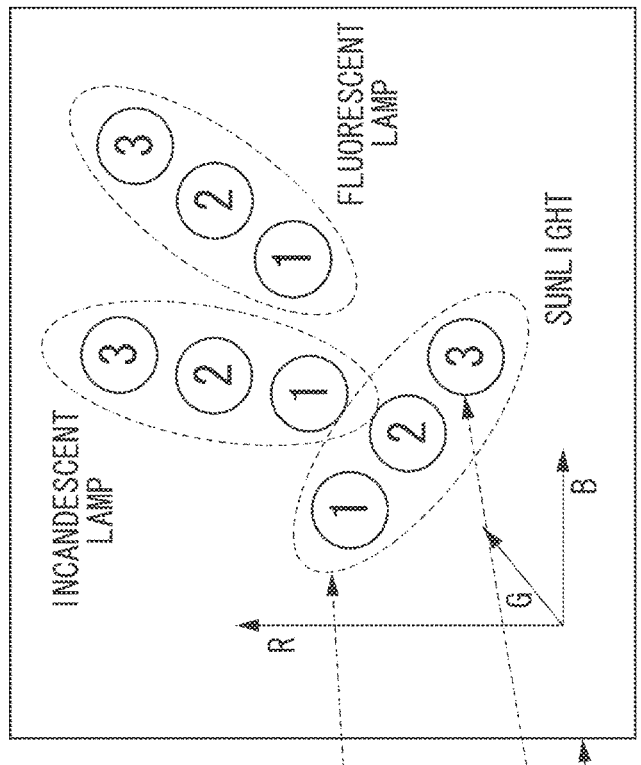
FIG. 3 is a schematic diagram illustrating a generation model in accordance with a skin attribute according to the first exemplary embodiment.

Subsequently, in step S208, the part-basis skin attribute identifier learning unit 115 learns an identifier of the attentional skin attribute (the index c) from the skin attribute feature amount extracted in step S207 as a skin attribute identifier. FIG. 3 is a diagram illustrating a generation model generated in accordance with a skin attribute, according to the present exemplary embodiment. In the present exemplary embodiment, Gaussian distribution is generated for each skin type by using maximum likelihood estimation according to Expression 8 below so as to use the skin attribute identifier based on the generation model.

$$p_L(c) = N(\phi_c^L | \mu_c, \Sigma) \quad [\text{Expression 8}]$$

where c represents a skin attribute index, $P_L(c)$ represents a prior probability of the skin attribute c in the attentional human body part, and $\phi_c^L$ represents a skin attribute feature amount extracted from a region having the skin attribute c with respect to the attentional human body part based on the skin attribute information input as the positive example region-of-interest information. Moreover, in Expression 8, $\mu_c$ and $\Sigma$ represent respectively an average and a variance-covariance of the skin attribute feature amounts.

In step S209, the part-basis skin attribute identifier learning unit 115 increments the skin attribute index c, and the processing returns to step S206.

In step S211, the learning result output unit 116 stores the part estimator received from the part estimator learning unit 112 and the skin attribute identifier received from the part-basis skin attribute processing unit 113 in the storage device (not illustrated) such as a memory or a hard disk drive (HDD) disposed in the image processing apparatus 100.

In step S207 described above, the RGB value is vectorized for collection of the skin attribute feature amount. However, an RGB value does not need be used as long as a skin attribute can be expressed. For example, a value such as YCbCr or YUV that is acquired from other color space may be used to collect a skin attribute feature amount.

Alternatively, human body parts may be separated into groups in terms of orientations, so that a model may be generated for each group. In such a case, when human body part detection is performed (described below), the human body part is collated with each of the generated group models. Accordingly, the model having the highest score may be used.

The part-basis skin attribute processing unit 113 learns the skin attribute identifier for each human body part. Alternatively, instead of the skin attribute identifier for each human body part, the part-basis skin attribute processing unit 113 may learn a common skin attribute identifier for all the human body parts.

Next, human skin region detection processing performed by the detection unit 120 is described below. FIG. 4 is a flowchart illustrating learning processing for the skin region detection processing according to the present exemplary embodiment.

In step S401, the detection data acquisition unit 121 acquires a detection target image.

In step S402, the part estimation unit 122 estimates each human body part region. With the method discussed in non-patent literature 2, the part estimation unit 122 estimates each human body part region using the part estimator generated by the part estimator learning unit 112. Thus, the human body part region estimated herein is a rectangular region. The part estimator is learned by the part estimator learning unit 112, and is stored in the storage device (not illustrated) such as a memory or an HDD disposed in the image processing apparatus 100.

In step S403, the skin attribute search/part correction unit 123 initializes the human body part index i to zero. Herein, the human body part index is a variable for designating each of the human body parts estimated by the part estimation unit 122.

In step S404, the skin attribute search/part correction unit 123 checks a value of the part index i to determine whether processing for all the human body parts is completed. If the skin attribute search/part correction unit 123 determines that the processing for all the human body parts is not completed (NO in step S404), the processing proceeds to step S405. If the skin attribute search/part correction unit 123 determines that the processing for all the human body parts is completed (YES in step S404), the processing proceeds to step S407.

In step S405, the part region skin attribute feature amount extraction unit 126 extracts a skin attribute feature amount for each pixel in the current attentional human body part region by a method similar to that used in the learning processing.

Subsequently, in step S406, the skin attribute temporary estimation unit 127 temporarily estimates a skin attribute of an attentional human body part i based on the skin attribute feature amount extracted in step S405. In the present exemplary embodiment, the skin attribute is temporarily estimated using Expression 9 below to estimate a skin attribute index c as a skin attribute.

$$\mathrm{argmax}_c \rho(c) = \mathrm{argmax}_c \frac{1}{M} \sum_{j \in p_i}^{M} \{p_L(\phi_{ij}^L \mid c) p_L(c)\} \quad [\text{Expression 9}]$$

where c represents a skin attribute index, $P_i$ represents a part boundary rectangle of the attentional human body part (herein, the human body part having the index i), j represents an index indicating a pixel in $p_i$, M represents the total number of pixels in $p_i$, $P_L$ (c) represents a prior probability of the skin attribute c in the attentional human body part calculated in the learning processing, $\varphi^L_{ij}$ represents a skin attribute feature amount calculated on the pixel j in the attentional human body part i, and PL ($\varphi^L_{ij}$|c) represents a likelihood with respect to the skin attribute index c of the skin attribute feature amount $\varphi^L_{ij}$.

In the present exemplary embodiment, therefore, the skin attribute index c acquired by Expression 9 is set to a skin attribute to which the attentional human body part belongs. However, if a value of ρ(c) is smaller than a predetermined threshold value, there is no attribute to which the attentional human body part belongs.

Then, in step S409, the part region skin attribute feature amount extraction unit 126 increments the part index i, and the processing returns to step S404.

In step S407, the part configuration correction unit 128 updates configuration of each human body part using the skin attribute estimated by the skin attribute temporary estimation unit 127. In the present exemplary embodiment, a position, a scale, and a rotation angle are updated as configuration of each human body part.

In such step S407, the part configuration correction unit 128 first searches for arrangement (position, scale, rotation angle) near each human body part with a part rectangular region of the current human body part, and temporarily determines arrangement that satisfies Expression 10 below. However, in the present exemplary embodiment, when configuration of each human body part is updated, a configuration search area is restricted. As for a position search area, the current part rectangular region is expanded by W/2 in a horizontal direction and H/2 in a vertical direction, where W and H are respectively a width and a height of the part rectangular region. The search is performed only within such an expanded area. Moreover, as for a scale search area, in addition to the current scale of the HOG feature pyramid, two scales are added in a vertical direction as a search area. Moreover, as for a rotation search area, the search is performed every 30° in an area of −180° to +180° if a direction of the current part rectangular region is 0°.

$$\max_c \rho'_i(c) = \max_c \frac{1}{M} \sum_{j \in p_i}^{M} \{p_L(\phi_{ij}^{\prime L} \mid c) p_L(c)\} \quad [\text{Expression 10}]$$

where c represents the skin attribute index estimated by the skin attribute temporary estimation unit 127 in step S406, and $\varphi^{\prime L}_{ij}$ represents a skin attribute feature amount calculated on a pixel j in the attentional human body part i in the search arrangement.

Next, the part configuration correction unit 128 searches for and updates configuration of each human body part by a method similar to that used by the part estimation unit 122. However, as for a discriminant function, Expression 11 is used.

$$w_e \cdot \mathrm{sigmoid}\left(\sum_{i=0}^{n} F_i \cdot \phi(H, p_i) + \sum_{i=1}^{n} a_i \cdot (x_i^{\prime \theta}, y_i^{\prime \theta}) + \right.$$
$$\left. b_i \cdot ((x_i^{\prime \theta})^2, (y_i^{\prime \theta})^2)\right) + w_c \cdot \frac{1}{n} \sum_{i=1}^{n} \max_c \rho'_i(c) \quad [\text{Expression 11}]$$

where sigmoid (x) of a first term is a sigmoid function expressed by Expression 12.

$$\mathrm{sigmoid}(x) = \frac{1}{1 + e^{-ax}} \quad [\text{Expression 12}]$$

Moreover, in Expression 11, $x'^\theta_i$ and $y'^\theta_i$ represent normalized relative positions of a part filer with respect to a root filter and the part filter is calculated based on the reference arrangement temporarily determined by Expression 10. Such $x'^\theta_i$ and $y'^\theta_i$ are defined by Expression 13.

$$(x_i^{\prime \theta}, y_i^{\prime \theta}) = ((x_i^\theta, y_i^\theta) - \alpha(x^\theta, y^\theta) + v_i^\theta)/s_i \quad [\text{Expression 13}]$$

where ($x^\theta$, $y^\theta$) represents coordinates of the root filter at the rotation angle temporarily determined by Expression 10, $V^\theta$ represents a two-dimensional vector indicating a relative position of ($x^\theta$, $y^\theta$) and the reference center coordinates of $p_i$ temporarily determined by Expression 10, $s_i$ represents a size of a part rectangular region corresponding to $p_i$. Moreover, "α" of a second term in a numerator on the right side represents a coefficient for matching a coordinate scale of the root filter with a coordinate scale of the part filter. In Expression 11, where ρ' (c) of a second term is substantially the same as ρ' (c) of Expression 10, n represents the total number of human body parts, and c represents the skin attribute index temporarily determined by the skin attribute temporary estimation unit 127 in step S406, and $w_e$ and $w_e$ represent weight distribution coefficients that satisfy Expression 14.

$$w_e + w_c = 1 \quad [\text{Expression 14}]$$

That is, Expression 11 calculates a normalized weighted sum of a score (a first term) without consideration of a skin attribute and calculates a score (a second term) considering a skin attribute. In this expression, a score is raised according to the degree of match for skin attribute. If there is little or no influence of skin attribute, a score is calculated based on a HOG feature similar to non-patent literature 2.

In step S408, the part configuration correction unit 128 compares the arrangement corrected this time in step S407 with the previous arrangement. In the present exemplary embodiment, coordinate scales are matched to calculate a sum total of differences of the center positions of the respective part boundary rectangles. If the sum total is less than a threshold value, the correction is considered to have converged. Accordingly, if the part configuration correction unit 128 determines that the correction of the human body part configuration has converged (NO in step S408), the processing proceeds to step S410. If the part configuration correction unit 128 determines that the correction of the human body part configuration has not converged (YES in step S408), the processing returns to step S404.

Upon completion of the part configuration correction, the processing proceeds to step S410 in which the skin region extraction unit 124 extracts a skin region. Regarding each pixel j in the part rectangular region of each human body part in the present exemplary embodiment, a pixel j' satisfying Expression 15 below is extracted as a pixel belonging to a skin region.

$$j' \in J'_i = \left\{ j : p_L(\phi^L_{ij} | c_i) > \frac{1}{M} \sum_{j \in p_i}^{M} p_L(\phi^L_{ij} | c_i) \right\} \quad \text{[Expression 15]}$$

Then, in step S411, the detection result output unit 125 outputs a detection result. In the present exemplary embodiment, a skin region, a skin attribute, and a part rectangular region are output as detection results for each human body part.

Accordingly, in the present exemplary embodiment, a human body part region is first estimated (step S402). Then, a skin attribute feature amount in the estimated human body part region is extracted, and a skin attribute is estimated (steps S406 and S407). The human body part configuration is corrected and updated based on the estimated skin attribute (step S407). The estimation of skin attribute for each human body part and the update of human body part configuration based on the skin attribute are repeated for a plurality of times until the correction and update of the human body part configuration converge. After such processing is completed, a skin region is extracted. According to the present exemplary embodiment, therefore, the skin region can be extracted in a state that the human body part configuration is estimated with good accuracy. This reduces misdetection or detection failure during detection of the human skin region, thereby enhancing the detection accuracy of the human skin region.

In the present exemplary embodiment, moreover, the skin region is extracted using a skin attribute identifier which has performed learning processing with respect to each skin attribute including elements of skin type, light source type, and reflection intensity. Thus, for example, even in an image with illumination conditions (light source type, reflection intensity) that vary for each human body part, a skin region can be detected with high accuracy.

In the above description, moreover, the area searched by the part configuration correction unit 128 is uniformly defined. However, a different search area may be defined for each human body part. For example, a rotation search area for human body part relating to a leg may be restricted between −90° and +90°

Moreover, the part estimator learning unit 112 may generate a human body model from human body part information input as positive region-of-interest information. In such a case, the part estimation unit 122 can set a location with the highest existence probability of each human body part position in the human body model as an initial position at the time of detection of each part.

In the above description, moreover, a sum total of differences of the center positions of the respective part boundary rectangles is calculated. If the calculated sum total is less than a threshold value, the operation is considered to have converged. Then, the processing proceeds to subsequent step. Alternatively, for example, when estimation of a skin attribute for each human body part and update of a human body part configuration based on the skin attribute are performed for the predetermined number of times, the operation may be considered to have converged. In such a case, the processing may proceed to next step.

Moreover, the part estimation unit 122 or the skin attribute search/part correction unit 123 may perform face detection processing to estimate and update a human body part region by using a result of the face detection. In the present exemplary embodiment, for example, a human body part region corresponding to a face region is fixed, and a score acquired by $F_f \cdot \varphi(H, p_f)$ in Expression 4 or Expression 11 is fixed where f is an index of the human body part region. Then, a cost function value relating to change in position of a part model f is set to zero. The face detection processing can use a method, for example, discussed in Japanese Patent Application Laid-Open No. 2010-271861.

Alternatively, a skin attribute of a face may be estimated in face detection processing, and a value of a skin attribute index c to be searched by the skin attribute search/part correction unit 123 may restricted. For example, if a skin type is estimated to be "yellow race" as a result of face detection, a search target can be an index c belonging to only the yellow race.

Moreover, the skin attribute search/part correction unit 123 may fix configuration of a reliable human body part. For example, before configuration of each human body part is searched and updated by Expression 11 in step S407, a human body part i satisfying Expression 16 is selected as a reliable human body part.

$$w_e \cdot \text{sigmoid}(F_i \cdot \phi(H, p_i)) + w_c \cdot \max_c \rho'_i(c) > th \quad \text{[Expression 16]}$$

where th represents a threshold value.

When the reliable human body part is selected, a reliable human body part region is fixed and a score acquired by $F_k \cdot \varphi(H, p_k)$ in Expression 11 is fixed, where k represents an index of the human body part region. Moreover, a cost function value relating to change in position of a reliable human body part model k is set to zero.

Alternatively, the detection data acquisition unit 121 may acquire information about a skin attribute, thereby restricting a value of the skin attribute index c searched by the skin attribute search/part correction unit 123. For example, when a user is "yellow race" and the detection data acquisition unit 121 acquires information about such a skin attribute, the skin attribute search/part correction unit 123 may search for only an index c belonging to the yellow race as a search target.

Hereinafter, a second exemplary embodiment of the present invention is described. In the second exemplary embodiment, a skin region extraction method using a skin attribute identifier based on an identification model is described. Components that are similar to the above first exemplary embodiment will be given the same reference numerals as above and description thereof will be omitted.

In the present exemplary embodiment, a method using Random Forests as an identification model is described. The Random Forests are discussed in non-patent literature 4 (L. Breiman, "Random Forests," Machine Learning, Vol. 45, No. 1, pp. 5-32, 2001.).

In the present exemplary embodiment, learning processing performed by a learning unit 110 is executed according to the flowchart illustrated in FIG. 2 similar to the first exemplary embodiment, except for collection of a skin attribute feature amount in step S207 and learning of a skin attribute identifier in step S208.

In the present exemplary embodiment, in step S207, a part-basis skin attribute feature amount extraction unit 114 collects a skin attribute feature amount of an attentional skin attribute (an index c) for an attentional human body part (an index i). For such processing, the part-basis skin attribute feature amount extraction unit 114 refers to positive example region-of-interest information from a positive example image group provided from a learning data acquisition unit 111.

First, the part-basis skin attribute feature amount extraction unit 114 extracts a positive example skin attribute feature amount from the positive example image group. Herein, the part-basis skin attribute feature amount extraction unit 114 specifies a skin region using a skin region mask for the attentional human body part included in the positive example region-of-interest information. In the present exemplary embodiment, the part-basis skin attribute feature amount extraction unit 114 extracts values of R, G, B, Y, U, V, Cb, Cr, H, S, and V serving as color space information for each pixel forming the specified skin region.

Next, the part-basis skin attribute feature amount extraction unit 114 extracts a negative example skin attribute feature amount from an index c negative example image group. The term "index c negative example image group" used herein represents images having indexes other than the index c among the positive example image group and the negative example image group provided from the learning data acquisition unit 111. In the present exemplary embodiment, upon random selection of an image from the index c negative example image group, the part-basis skin attribute feature amount extraction unit 114 randomly selects a pixel from the selected image, and extracts each of R, G, B, Y, U, V, Cb, Cr, H, S, and V values serving as color space information.

Subsequently, in step S208, a part-basis skin attribute identifier learning unit 115 learns an identifier of the attentional skin attribute (index c) from the skin attribute feature amount collected in step S207 as a skin attribute identifier. In the present exemplary embodiment, Random Forests are generated from the positive example skin attribute feature amount and the negative example skin attribute feature amount collected in step S207. Each of the R, G, B, Y, U, V, Cb, Cr, H, S, and V values is used as an explanatory variable. In the present exemplary embodiment, the number of decision trees expressed as T and a depth of node expressed as D are determined beforehand by a preliminary experiment.

Next, a description is given of detection processing performed by the detection unit 120 according to the present exemplary embodiment. In the present exemplary embodiment, identification processing is executed according to the flowchart illustrated in FIG. 4 similar to the first exemplary embodiment, except for processing described below. Hereinafter, the processing that differs from that of the first exemplary embodiment is described.

According to the present exemplary embodiment, in step S405, a part region skin attribute feature amount extraction unit 126 extracts a skin attribute feature amount for each pixel in a current attentional human body part region by a method similar to that used in the learning processing. In the present exemplary embodiment, the part region skin attribute feature amount extraction unit 126 extracts each of R, G, B, Y, U, V, Cb, Cr, H, S, and V values on a pixel basis.

Subsequently, in step S406, a skin attribute temporary estimation unit 127 temporarily estimates a skin attribute of an attentional human body part i from the skin attribute feature amount extracted in step S405. In the present exemplary embodiment, each skin attribute feature amount is input to the T pieces of decision trees per skin attribute to calculate an output average value of each skin attribute. A skin attribute to which the attentional human body part belongs to is a skin attribute c with $E^c_{max}$, where $E^c_{max}$ is a largest output average value. If the largest output average value is smaller than a predetermined threshold value, the attentional human body part does not belong to any attribute.

In step S407, a part configuration correction unit 128 updates configuration of each human body part using the skin attribute estimated by the skin attribute temporary estimation unit 127. In the present exemplary embodiment, the part configuration correction unit 128 updates a position, a scale, and a rotation angle as configuration of the human body part. The part configuration correction unit 128 first searches for arrangement (position, scale, rotation angle) near each human body part with reference to a part rectangular region of the current human body part, and temporarily determines arrangement that satisfies Expression 17 below. However, when the configuration of each human body part is updated, there is restriction on a search area of the human body part configuration. For a position search area, the current part rectangular region is expanded by W/2 in a horizontal direction and H/2 in a vertical direction, where W and H are respectively a width and a height of the part rectangular region. The search is performed only within such an expanded area. Moreover, as for a scale search area, in addition to the current scale of a HOG feature pyramid, two scales are added in a vertical direction as a search area. Moreover, as for a rotation search area, the search is performed every 30° in an area of −180° to +180° if a direction of the current part rectangular region is 0°.

$$\max_c \rho'(c) = E^c_{max} \qquad \text{[Expression 17]}$$

where c represents the skin attribute index estimated by the skin attribute temporary estimation unit 127 in step S406.

Subsequently, configuration of each human body part is searched and updated by a method similar to that used by the part estimation unit 122. Expression 11 is used for a discriminant function similar to the first exemplary embodiment.

When the update of the human body part configuration is completed by the above processing, the processing proceeds to step S410. In step S410, a skin region extraction unit 124 extracts a skin region. In the present exemplary embodiment, the skin region extraction unit 124 extracts, for each pixel j in a part rectangular region of each human body part, a pixel j' satisfying Expression 18 below as a pixel belonging to the skin region.

$$j' \in J'_i = \{j : p_L(\phi_{ij}^L | c_i) > E_{max}^c\} \qquad \text{[Expression 18]}$$

In step S411, a detection result output unit 125 outputs a detection result similar to the first exemplary embodiment.

In the present exemplary embodiment, the Random Forests are used as an identification model. However, other identification models may be used. For example, a super vector machine (SVM) proposed by Vapnik et. al., or adaptive boosting (AdaBoost) discussed in non-patent literature 5 (Y. Freund, and R. E. Schapire, "A decision-theoretic generalization of on-line learning and an application to boosting," Computational Learning Theory: Eurocolt, pp. 23-37, 1995.) can be used.

According to the present exemplary embodiment, estimation of skin attribute for each human body part region and update of human body part configuration based on the skin attribute are alternately repeated until correction and update of the human body part configuration are determined to have converged. After such processing is completed, a skin region is extracted. According to the present exemplary embodiment, therefore, the skin region can be extracted in a state that the human body part configuration is estimated with good accuracy. This reduces misdetection or detection failure during detection of human skin region, thereby enhancing the detection accuracy of the human skin region.

According to the exemplary embodiments, therefore, when a human skin region is detected, misdetection and detection failure can be reduced.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-242444, filed Nov. 28, 2014, which is hereby incorporated by reference herein in its entirety.

What is claimed is:

1. An image processing apparatus comprising:
at least one memory that stores a program of instructions; and
at least one processor that executes the program of instructions to cause the image processing apparatus to implement:
an acquisition unit configured to acquire an image from which a skin region of a human body is to be extracted;
a part estimation unit configured to estimate a human body part region in the acquired image;
a skin attribute estimation unit configured to estimate a skin attribute of the estimated human body part region;
a part correction unit configured to correct the human body part region based on the estimated skin attribute; and
a skin region extraction unit configured to extract the skin region from the acquired image based on the skin attribute of the estimated human body part region and the corrected human body part region,
wherein the estimation of the skin attribute of the human body part region by the skin attribute estimation unit and the correction of the human body part region by the part correction unit are repeated for a plurality of times, and
wherein the part correction unit compares a difference in position of the human body part region between before and after corrections of the human body part region with a predetermined value, and estimation of the skin attribute of the human body part region by the skin attribute estimation unit and correction of the human body part region by the part correction unit are repeated until the difference in position becomes smaller than the predetermined value.

2. The image processing apparatus according to claim 1, wherein the at least one processor executes the program of instructions to cause the image processing apparatus to further implement:
a feature amount extraction unit configured to extract a feature amount relating to the skin attribute of the human body part region,
wherein the skin attribute estimation unit estimates the skin attribute of the human body part region based on the extracted feature amount.

3. The image processing apparatus according to claim 1, wherein the acquisition unit further acquires information about the skin region to be extracted,
wherein the skin attribute estimation unit estimates the skin attribute of the human body part region based on the acquired information.

4. The image processing apparatus according to claim 1, wherein the part estimation unit estimates the human body part region based on a brightness gradient of the image.

5. The image processing apparatus according to claim 1, wherein the part correction unit corrects at least one of a position, a range, a size, and a scale of the human body part region.

6. The image processing apparatus according to claim 1, wherein the part estimation unit detects a face region from the acquired image and estimates the human body part region based on the detected face region.

7. The image processing apparatus according to claim 6, wherein the part correction unit corrects the human body part region based on the detected face region.

8. The image processing apparatus according to claim 1, wherein the at least one processor executes the program of instructions to cause the image processing apparatus to further implement:
an output unit configured to output the extracted skin region as a detection result.

9. The image processing apparatus according to claim 1, wherein the skin attribute includes at least one of a skin type, a light source type, and a reflection intensity.

10. The image processing apparatus according to claim 1, wherein the at least one processor executes the program of instructions to cause the image processing apparatus to further implement:
a learning data acquisition unit configured to acquire an image group including a positive example image and a negative example image, and region-of-interest information about the positive example image;
an estimator learning unit configured to learn a part estimator for estimation of the human body part region based on the acquired image group and the acquired region-of-interest information; and an identifier learning unit configured to learn a skin attribute identifier for estimation of the skin attribute of the human body part region based on the acquired image group and the acquired region-of-interest information;

wherein, the part estimation unit estimates, based on the part estimator, the human body part region in the acquired image from which the skin region is to be extracted, and wherein the skin attribute estimation unit estimates, based on the skin attribute identifier, the skin attribute of the human body part region from the acquired image from which the skin region is to be extracted.

11. The image processing apparatus according to claim 10, wherein the region-of-interest information includes at least one of a range, skin color, and the skin attribute of the human body part region.

12. The image processing apparatus according to claim 10, wherein the identifier learning unit further learns a human body model generated by modeling a positional relation of human body parts, and wherein the part correction unit corrects the human body part region based on the human body model.

13. The image processing apparatus according to claim 10, wherein the identifier learning unit generates the skin attribute identifier based on a generation model.

14. The image processing apparatus according to claim 10, wherein the identifier learning unit generates the skin attribute identifier based on an identification model.

15. The image processing apparatus according to claim 10, wherein the estimator learning unit learns the part estimator based on a brightness gradient in the image group.

16. The image processing apparatus according to claim 10, wherein the identifier learning unit learns the skin attribute identifier for estimation of the skin attribute of the human body part based on color information of the acquired image group.

17. An image processing method comprising:
acquiring an image from which a skin region of a human body is to be extracted;
estimating a human body part region in the acquired image;
estimating a skin attribute of the estimated human body part region;

correcting the human body part region based on the estimated skin attribute; and
extracting the skin region from the acquired image based on the skin attribute of the estimated human body part region and the corrected human body part region, wherein the estimating of the skin attribute of the human body part region and the correcting of the human body part region are repeated for a plurality of times, and wherein a difference in position of the human body part region between before and after corrections of the human body part region is compared with a predetermined value, and estimation of the skin attribute of the human body part region and correction of the human body part region are repeated until the difference in position becomes smaller than the predetermined value.

18. A non-transitory computer-readable recording medium that stores a program for causing a computer to function as units of an image processing apparatus, the image processing apparatus comprising:

an acquisition unit configured to acquire an image from which a skin region of a human body is to be extracted;
a part estimation unit configured to estimate a human body part region in the acquired image;
a skin attribute estimation unit configured to estimate a skin attribute of the estimated human body part region;
a part correction unit configured to correct the human body part region based on the estimated skin attribute; and
a skin region extraction unit configured to extract the skin region from the acquired image based on the skin attribute of the estimated human body part region and the corrected human body part region, wherein the estimation of the skin attribute of the human body part region by the skin attribute estimation unit and the correction of the human body part region by the part correction unit are repeated for a plurality of times, and wherein the part correction unit compares a difference in position of the human body part region between before and after corrections of the human body part region with a predetermined value, and estimation of the skin attribute of the human body part region by the skin attribute estimation unit and correction of the human body part region by the part correction unit are repeated until the difference in position becomes smaller than the predetermined value.

* * * * *